United States Patent [19]
Reynolds

[11] Patent Number: 5,257,914
[45] Date of Patent: Nov. 2, 1993

[54] ELECTRONIC CONTROL INTERFACE FOR FLUID POWERED DIAPHRAGM PUMP

[75] Inventor: Steven M. Reynolds, Mansfield, Ohio
[73] Assignee: Warren Rupp, Inc., Mansfield, Ohio
[21] Appl. No.: 903,341
[22] Filed: Jun. 24, 1992
[51] Int. Cl.$^5$ .............................. F04B 49/00
[52] U.S. Cl. ..................... 417/293; 417/43
[58] Field of Search ............ 417/393, 43, 46, 418; 91/275; 92/5

[56] References Cited

U.S. PATENT DOCUMENTS

| | | | |
|---|---|---|---|
| 2,832,919 | 4/1958 | Reutter | 417/418 |
| 3,782,863 | 1/1974 | Rupp | 417/393 |
| 4,345,442 | 8/1982 | Dorman | 417/418 |
| 4,436,493 | 3/1984 | Credle | 417/393 |
| 4,472,115 | 9/1984 | Rupp | 417/393 |
| 4,682,937 | 7/1987 | Credle | 417/393 |
| 4,927,335 | 5/1990 | Pensa | 417/393 |
| 5,076,890 | 12/1991 | Balembois | 417/43 |
| 5,174,731 | 12/1992 | Korver | 417/393 |

Primary Examiner—Richard A. Bertsch
Assistant Examiner—Alfred Basichas
Attorney, Agent, or Firm—Hill, Steadman & Simpson

[57] ABSTRACT

A pump control interface for use in a diaphragm pump including at least one diaphragm adapted to move between a suction stroke and a discharge stroke during operation of the pump. A diaphragm follower is connected for movement with the diaphragm during operation of the pump. A sensor mechanism is provided for sensing at least the position and rate of movement of the diaphragm by sensing the position and rate of movement of the diaphragm follower. In one embodiment, the control interface is provided as a rod interconnecting two diaphragms of a dual diaphragm pump for synchronous movement. A plurality of conductive targets are disposed on the rod, and a proximity switch is mounted adjacent to the rod, in order to produce pulsed output signals when in proximity with the conductive targets.

15 Claims, 2 Drawing Sheets

ELECTRONIC CONTROL INTERFACE FOR FLUID POWERED DIAPHRAGM PUMP

TECHNICAL FIELD

The present invention relates to an electronic control interface for fluid powered diaphragm pumps, and specifically to a pump control interface that is capable of providing information relating to the position and speed of movement of a pump diaphragm.

BACKGROUND OF THE INVENTION

Diaphragm pumps are widely used, particularly for pumping liquids, solutions, viscous materials, slurries, suspensions, or flowable solids. Such pumps, particularly double diaphragm pumps of the type disclosed in U.S. Pat. No. 3,782,863 and 4,472,115 are well known for their utility in pumping viscous or solids laden liquids, as well as for pumping plain water or other liquids, and high or low viscosity solutions based on such liquids. Accordingly, such double diaphragm pumps have found extensive use in pumping out sumps, shafts, and pits, and generally inhaling a great variety of slurries, sludges, and waste-laden liquids. Fluid driven diaphragm pumps offer certain further advantages and convenience, effectiveness, portability, and safety. Double diaphragm pumps are rugged and compact and, to gain maximum flexibility, are often served by a single intake line and deliver liquid through a short manifold to a single discharge line.

In such pumping apparatus, a diaphragm forming a movable wall of a pumping chamber is moved in a suction stroke to draw liquid into the pumping chamber. The diaphragm is then moved in the opposite direction in a pumping stroke to force the liquid out of the pumping chamber by pressurized drive fluid acting directly on the diaphragm.

In double diaphragm pumps in which two diaphragms are connected together, each diaphragm has, on one side, a pumping chamber and, on the other side, a drive fluid chamber. Air or other fluid under pressure is alternately introduced into and exhausted from each drive fluid chamber. A control valve directs the fluid under pressure into one drive fluid chamber, causing the associated diaphragm to move in a pumping stroke, while the connecting mechanism pulls the other diaphragm in a suction stroke and causes air in its associated drive fluid chamber to be exhausted. Then air under pressure is introduced into the other drive fluid chamber to move its diaphragm in a pumping stroke.

Double diaphragm pumps have conventionally used a connecting rod extending coaxially between the two diaphragms. In such arrangements, the drive fluid chambers of each pump section are adjacent to one another, and the pumping sections are spaced outwardly relative to one another.

The various uses to which such pumps are applied require widely varying pump speeds and operating characteristics. Furthermore, even within a single application, fluid characteristics such as viscosity or slurry concentration are subject to change during pump operation. Frequently, the operational speed or other characteristics of the pump must be changed in order to accommodate such changes in pumped fluid.

As is apparent from the foregoing, the need exists for a system in which information relating to pump speed and pumped fluid characteristics can be monitored, and such information can in turn be used to effect pump control.

SUMMARY OF THE INVENTION

The present invention provides a relatively simple and reliable means by which pump speed can be monitored. Specifically, the present invention provides for a pump control interface in a diaphragm pump including at least one diaphragm adapted to move between the suction stroke and a discharge stroke during operation of the pump. A diaphragm follower is connected for movement with the diaphragm during operation of the pump. A sensor mechanism is provided with senses at least the position and rate of movement of the diaphragm by sensing the position and speed of movement of the diaphragm follower.

In a preferred embodiment, the diaphragm follower is provided in the form of a rod connected to the diaphragm. Sensor-detectable indicia are disposed on the rod. The indicia are adapted to be read by the sensor mechanism. In a preferred embodiment, the diaphragm follower rod connects two diaphragms of a dual diaphragm pump together for synchronous operation. The sensor mechanism generates signals that can be received by a central control arrangement that is capable of using the information from the sensor to control actuation of the pump.

Other objects and advantages of the present invention will be apparent upon reference to the accompanying description when taken in conjunction with the following drawings.

DESCRIPTION OF THE PREFERRED EMBODIMENTS

Figure 1:
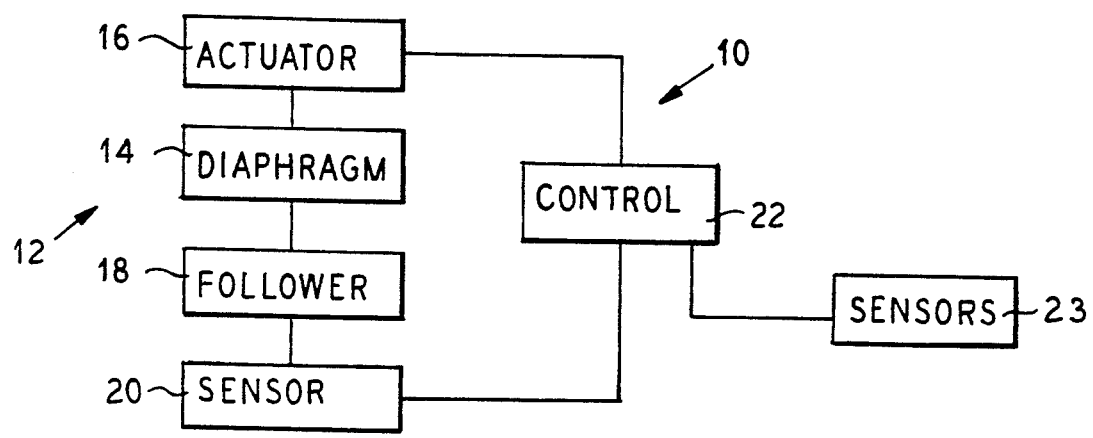
FIG. 1 illustrates a schematic diagram in accordance with the principles of the present invention.

FIG. 1 schematically shows a pump system 10 embodying the principles of the present invention. A pump assembly 12 includes a diaphragm pumping element 14 that is moved between a suction stroke and a discharge stroke by an actuator 16, for example, a solenoid-controlled multi-stage pneumatic cylinder or other suitable actuating mechanism. A diaphragm follower 18 is connected to the diaphragm for movement therewith during operation of the pump assembly 12. A sensor mechanism 20 is connected in proximity to the diaphragm follower 18. The sensor 20 senses the position and rate of movement of the diaphragm 14 by sensing the position and speed of movement of the diaphragm follower 18. It is contemplated that the sensor and diaphragm follower could be provided as a variety of interactive elements. For example, the diaphragm follower could be provided as a rod connected to the diaphragm, with the rod including a plurality of sensor detectable indicia which are capable of being read by the sensor. The indica could be a plurality of conductive targets on the rod, and the sensor could be provided as a proximity switch adapted to produce a pulsed output signal when in a predetermined proximity with the conductive targets. Alternatively, the indicia could be provided as a plurality of optically readable targets disposed on the rod, and the sensor could be provided as an optical scanner. In yet another alternative, the indicia could be provided as a plurality of textured regions on the rod, and the sensor could be provided as an electron beam sensor. In still another alternative, the follower and sensor could be provided as an arrangement employing sonic detection.

Irrespective of the particular mechanisms employed, it is essential that the sensor is capable of detecting at least the position and rate of movement of the diaphragm by sensing the position and rate of movement of the diaphragm follower.

The sensor 20 is capable of generating signals corresponding to movement of the diaphragm follower 18. Signals from the sensor 20 are transmitted to a central control unit 22, for example, a microprocessor. The control unit 22 is adapted to generate control signals to control operation of the actuator 16. The control unit 22 may receive additional input from sensors 23. The sensors 23 can be provided as inline flow condition sensors such as flow rate sensors, concentration sensors, and flow volume sensors, or as pump condition sensors, such as actuator displacement sensors. Examples of such sensors are provided in copending application U.S. Ser. No. 07/871,191, filed on Apr. 20, 1992 and assigned to the assignee of the present invention, the specification of which is incorporated by reference herein.

Since the position and rate of movement of the diaphragm is effected by pumped fluid characteristics, the ability of the central control unit 22 to monitor diaphragm movement through the follower 18 and the sensor 20 allows the control unit 20 to, when necessary, change the pump speed or cycle pattern of the pump assembly 12 in response to changes in pumped fluid characteristics. Similarly, the control unit 22 could be used to monitor pump flow rate based on a pump displacement factor and the pulse rate output from the follower 18 and sensor 20. Additionally, the pulse rate of normal operation could be sampled and stored for later comparison in the control unit 22. This would allow operational problems or changes in pump fluid characteristics to be easily identified and corrected by the control unit 22.

Figure 3:
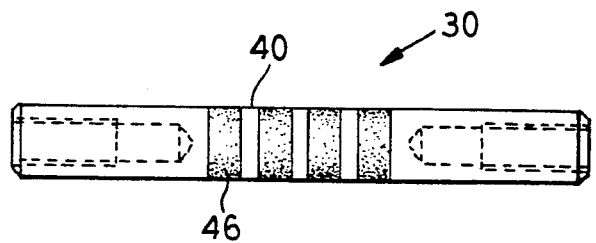
FIG. 3 illustrates an elevational view of a control rod in accordance with the embodiment illustrated in FIG. 2.
Figure 2:
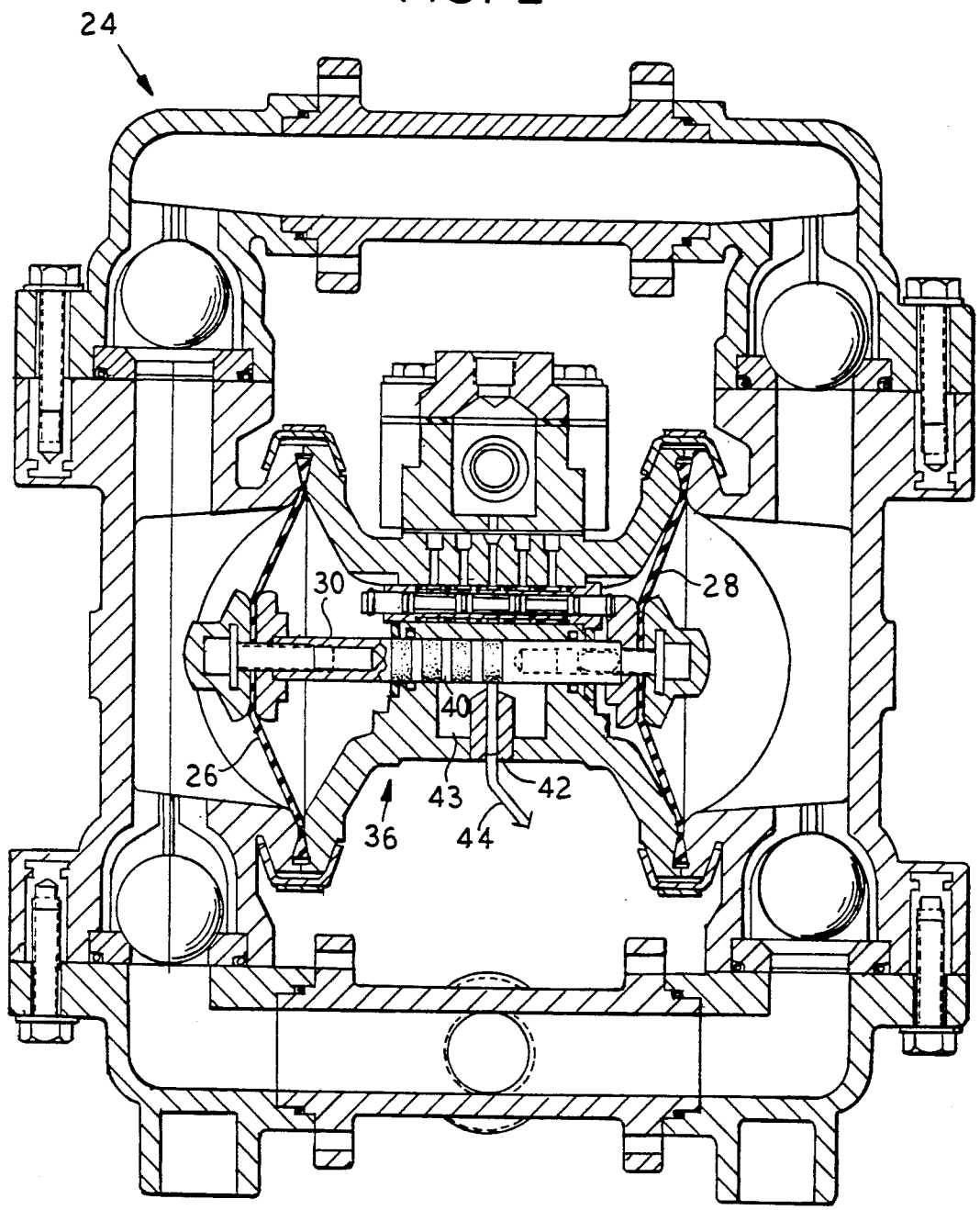
FIG. 2 illustrates a sectional view of a dual diaphragm pump incorporating a control interface in accordance with the principles of the present invention.

FIGS. 2 and 3 illustrate an embodiment of the present invention which represents the best mode currently known by the inventor for practicing the invention. FIG. 2 illustrates a pump assembly 24. The pump assembly 24, with the exception of the specific construction relating to the present invention, is similar to a standard double-diaphragm pump marketed by the assignee of the present invention as the SANDPIPER Model PB3/4-A Type 3 pump. The pump assembly 24 operates in accordance with the characteristics set forth in the background of the invention.

The pump assembly 24 includes a first diaphragm 26 disposed for reciprocation within a first half of the pump assembly 24 and a second diaphragm 28 disposed within a second half 29 of the pump assembly 24. The diaphragm 26 is connected for synchronous movement with the diaphragm 26 by a diaphragm rod 30. The diaphragm rod 30 is provided with a plurality of conductive targets 32a along its length, as will be described in detail hereinbelow. The rod 30 is disposed for reciprocable movement within a bore 34 in a central housing portion 36 of the pump assembly 24. A plurality of rod seals 38 are provided to seal the rod 30 and bore 34 against contamination.

The rod 30 is provided with a plurality of conductive indicia or targets 40 at spaced intervals along its length. The indicia or targets 40 are provided in the form of annular bands having a diameter equal to the diameter of the rod, so that reciprocation of the rod 30 through the bore 34 is not impeded, and the seal affected by the rod seals 38 is maintained.

Also within the central portion 36 of the pump assembly 24 is a proximity switch 42. The proximity switch 42 is disposed within a sealed chamber 43 and may be provided, for example, as a type "E" three-wired DC, self contained proximity sensor, manufactured by "Pepperl+Fuchs, Inc.". A plurality of leads 44 extend from the proximity switch 42 to a controller, in accordance with the general description of FIG. 1. Although the illustrated embodiment shows the proximity sensor 42 in the sealed chamber 43 as being directly exposed to the indicia 40, it is also contemplated that a further containment wall or seal could be used between the indicia and the sensor. Such a seal would have to be "transparent" to the interaction between the indicia and the sensor, so that the indicia remained detectably exposed to the sensor. For example, with a conductive target and a proximity sensor as illustrated, the additional seal would have to be of non-conductive material. Similarly, with an optical sensing arrangement, the additional seal would have to allow for the passage of light.

FIG. 3 shows a more detailed view of the rod 30. The rod 30 includes a plurality of conductive targets 40, which are defined by non-conductive portions 46. The rod 30 can be manufactured by forming a series of undercuts along the length of a standard stainless steel diaphragm rod. The undercuts are then filled with a non-conductive material, for example a ceramic, to bring the rod back to its full outside diameter. The rod is then finished to produce a smooth, uninterrupted surface so that the rod may travel through the seal bearings and shaft seals unimpeded. The non-conductive material is transparent to the proximity switch, which senses only the original material steps or targets spaced between the filler material.

During operation of the pump, the rod 30 reciprocates in the bore 34, causing the targets 40 to pass by the proximity switch 42. As each of the targets passes by the proximity switch, the proximity switch generates a pulses output signal that travels through the leads 44 to a central controller. The central controller contains a clock mechanism of conventional structure, and can thus determine the elapsed time between pulse signals, thus determining the speed of reciprocation of the rod 30, and thus of the diaphragms 26 and 28. It is also contemplated that the control unit would have the capability of using changes in the speed of travel of the diaphragms to calculate acceleration and other speed-dependent characteristics. Furthermore, it is contemplated that the direction of travel of the diaphragm follower rod 30 could also be sensed, for example, by providing the targets 40 with predetermined, varying widths.

Although the present invention has been described with reference to a specific embodiment, those of skill in the art will recognize that changes may be made thereto without departing from the scope and spirit of the invention as set forth in the appended claims.

I claim as my invention:

1. In a diaphragm pump including at least one diaphragm adapted to move through a suction stroke and a discharge stroke during operation of said pump, a pump control interface comprising:

- a diaphragm follower rod connected for corresponding movement with said diaphragm during operation of said pump;
- a plurality of sensor-detectable indicia disposed on said rod and spaced apart therealong in the direction corresponding to the movement of said diaphragm during operation of said pump; and
- a proximity sensor adapted to produce pulsed output signals when in a predetermined proximity with said indicia,
- wherein the position and rate of movement of said diaphragm during the course of a suction stroke and a discharge stroke, and not merely at the end of said strokes, is sensed by said proximity sensor.

2. A pump control interface according to claim 1, wherein said indicia comprise a plurality of conductive targets disposed on said rod.

3. A pump control interface according to claim 2, wherein said rod has a predetermined, constant diameter, and said conductive targets comprise a plurality of annular bands having a diameter equal to said diameter of said rod.

4. A pump control interface according to claim 1, wherein said indicia comprise a plurality of optically readable targets disposed on said rod.

5. A pump control interface according to claim 1, wherein said indicia comprise a plurality of textured regions disposed on said rod.

6. A pump control interface according to claim 1, wherein said at least one diaphragm comprises a pair of diaphragms.

7. A pump control interface according to claim 6, wherein said diaphragms are connected to one another for synchronous operation.

8. A pump control interface according to claim 7, wherein said diaphragm follower rod connects said diaphragms to one another.

9. A diaphragm pump comprising:
- a central housing portion;
- a bore formed within said central housing portion;
- a sealed sensor chamber disposed within said central housing portion;
- first and second pump halves disposed on opposite sides of said central housing portion;
- a first diaphragm disposed in said first pump half and adapted for movement through a suction stroke and a discharge stroke;
- a second diaphragm disposed in said second pump half and adapted for movement through a suction stroke and a discharge stroke;
- a rod disposed for reciprocation within said bore of said central housing portion, said rod having a first end connected to said first diaphragm, and a second end connected to said second diaphragm, said rod including a plurality of sensor-detectable indicia along a predetermined length thereof;
- sensor means, mounted adjacent said rod in said sealed sensor chamber of said central housing portion in a position such that said sensor means is detectably exposed to said indicia on said rod, for generating signals in the presence of said indicia; and
- control means, connected to said sensor means, for receiving said signals from said sensor means and determining the position and rate of movement of said rod during the course of each diaphragm's suction and discharge strokes, not merely at the end of such strokes.

10. A pump according to claim 9, wherein said indicia comprise a plurality of conductive targets disposed on said rod.

11. A pump according to claim 10, wherein said rod has a predetermined, constant diameter, and said conductive targets comprise a plurality of annular bands having a diameter equal to said diameter of said rod.

12. A pump according to claim 11, wherein said sensor means comprises at least one proximity switch adapted to produce pulsed output signals when in a predetermined proximity with said indicia.

13. A pump according to claim 9, wherein said indicia comprise a plurality of optically readable targets disposed on said rod, and said sensor means comprises an optical scanner adapted to produce pulsed output signals when in a predetermined proximity with said indicia.

14. A pump according to claim 9, wherein said indicia comprise a plurality of textured regions disposed on said rod, and said sensor means comprises an electron beam sensor adapted to produce pulsed output signals when in a predetermined proximity with said textured regions.

15. A pump according to claim 9, further comprising additional sensor means, connected to said control means, for providing said control means with signals corresponding to pump system characteristics.

* * * * *